United States Patent [19]

Yamamoto et al.

[11] 4,155,968

[45] May 22, 1979

[54] METHOD OF MANUFACTURING MATS TO BE PROCESSED INTO COMPOSITION BOARDS

[75] Inventors: Teruo Yamamoto, Toyonaka; Tutomu Shimabayashi, Kishiwada; Yoichi Eumi, Senboku; Fumikatsu Ishii; Miyoji Fujiki, both of Kishiwada, all of Japan

[73] Assignee: Hokushin Gohan Kabushiki Kaisha, Osaka, Japan

[21] Appl. No.: 817,211

[22] Filed: Jul. 20, 1977

[30] Foreign Application Priority Data

Jul. 20, 1976 [JP] Japan ................................ 51-086975

[51] Int. Cl.[2] ................................................ B29J 5/08

[52] U.S. Cl. .................................. 264/40.4; 264/40.7; 264/113; 264/119; 264/121; 264/122

[58] Field of Search ..................... 264/40.4, 40.7, 113, 264/121, 122, 119

[56] References Cited

U.S. PATENT DOCUMENTS

| | | | |
|---|---|---|---|
| 2,698,271 | 12/1954 | Clark | 264/113 |
| 3,632,371 | 1/1972 | Mikulka | 264/113 |
| 4,091,161 | 5/1978 | Desverchere | 264/121 |

*Primary Examiner*—Robert F. White
*Assistant Examiner*—James R. Hall
*Attorney, Agent, or Firm*—Larson, Taylor and Hinds

[57] ABSTRACT

An improved method or process for the continuous manufacture of mats to be processed into composition boards is disclosed, the board-forming process being a dry process involving hot-pressing of the mats and curing of the binder. The mats comprise a fibrous or particulate material or materials, and a binder, the mats being dry. The mat material is laid onto a conveyor by formers or felters. In order to ensure that the resulting composition board has a uniform strength distribution and uniform specific gravity or density, a beta ray density measuring device measures successively the weight of air-borne material passing through a conduit or conduits to the forming apparatus, and the measured value is used to regulate the speed of the conveyor. A gamma ray density measuring device is disposed just beyond the forming apparatus to measure the weight of mats emerging from the forming process, with the measured value being used to regulate a shave-off roll movable vertically above the formed mat, to regulate the height of the mat such that the mat, when formed into a board, will have uniform strength distribution and uniform specific gravity or density.

1 Claim, 1 Drawing Figure

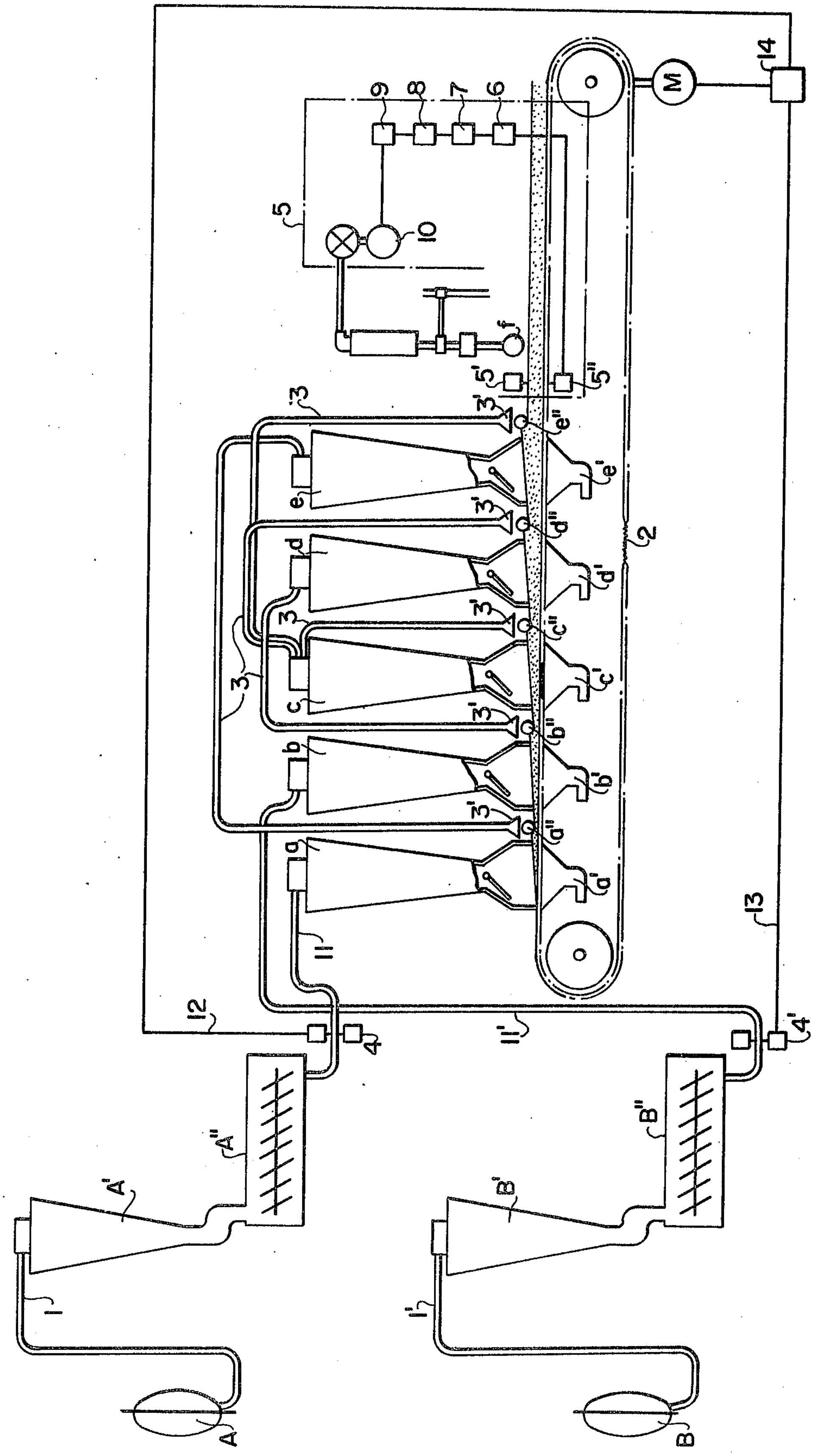
M
14
13
12
11
11'
4
4'
2
3
3'
5
5'
5''
6
7
8
9
10
f
a
b
c
d
e
a'
b'
c'
d'
e'
a''
b''
c''
d''
e''
A
A'
A''
B
B'
B''
1
1'

METHOD OF MANUFACTURING MATS TO BE PROCESSED INTO COMPOSITION BOARDS

FIELD OF THE INVENTION

This invention relates to a continuous method or process of manufacturing mats to be further used in manufacturing composition boards in a dry process, the mats typically comprising a crushed and refined wood material together with a suitable binder, and the board being formed by hot-pressing of the mats and curing of the binder. The boards are commonly referred to as fibre board or particle board. Suitable materials include not only wood, but also inorganic granular or fibrous materials, examples being perlite, vermiculite, slagwool, rockwool, asbestos, etc. The invention is particularly concerned with producing dry mats that are free of any unevenness which would result in uneven strength distribution or specific gravity of the composition boards made from the mats.

BACKGROUND OF THE INVENTION

The unevenness in specific gravity and strength of composition boards made by conventional processes becomes fairly conspicuous when the board is subjected to a secondary processing, such as painting, laminating, cutting, etc. This unevenness results in a lowering of the yield ratio of usable board material relative to total produced board material.

Studies by the present applicants reveal that the main cause of the unevenness of specific gravity and strength of the composition board does not depend merely on variations of the application rate of adhesive or binder, as generally thought, but rather that, as a phenomenon arising from the dry manufacturing process of the composition board, the density unevenness of fiber and/or grain comprising the mat constitutes another principle cause of uneven characteristics in the composition board. hence, particular attention has been paid to minimization of density unevenness of the fiber and/or grain in the mat, along with uniformity of application or spreading rate of the adhesive.

The ultimate key object of our invention is to procure a composition board whose strength distribution is uniform throughout, such that further processing or work on or with the board can be effected with high accuracy and efficiency.

Other objects and characteristics of the invention will be clear from the ensuing explanations and description.

Although the ensuing description deals with an embodiment of the invention utilizing wood fiber in making the dry fiber mat, it will be understood that various fibrous or granular materials as conventionally used are applicable to the instant invention, together with appropriate binders for such materials.

In conventional manufacturing processes for dry fiber mats, the fiber is conveyed in an air stream from a refiner and is sprayed and coated with a suitable adhesive or binder. After separation from the air stream by a cyclone separator, the fiber is formed into mats on a wire screen belt conveyor to a given height and size, this conventionally being done by forming or felter apparatus. However, the quantity of fiber conveyed per unit of time to the former, after adhesive is applied in a mixer, varies irregularly, increasing or decreasing. This irregular increase or decrease of the air-conveyed fiber quantity is attributed to the fact that the raw material chips that are treated by the refiner are controlled not by weight, but by volume, so the bulk density varies according to the shape, kind of wood, etc., and this makes the weight and bulk density of the fiber discharged from the refiner irregular in accordance with changes in the refining conditions.

When the fiber is formed into a mat on the wire screen conveyor by the former, there is hardly any problem with variations transversely across the mat, but in the longitudinal direction a noticeable unevenness of bulk density occurs.

In the conventional process, the formed mat is shaved to an equal or uniform thickness by shave-off rolls disposed immediately after the forming apparatus or immediately after individual formers, such that the mat appears uniform, but the bulk density of the fiber deposited from the former onto the wire screen conveyor running at a given speed varies not only in accordance with changes in the quantity of fiber conveyed to the former, but also in accordance with suction from the vacuum box or boxes underneath the wire-netting conveyor. Accordingly, where the fiber is deposited with relatively greater thickness, the bulk density of the mat rises due to the suction strength from the vacuum box or boxes. In either case, even if the mat thickness is thereafter uniformly shaved off by the shave-off roll or rolls, the problem of unevenness of bulk density remains unsettled.

In order to operate a rejector continuously measuring the weight and bulk density of formed mats so as to reject or remove those mats exceeding a predetermined range of density variations, it is known to use a gamma ray density measuring device, measuring spots or points on a finished mat, but such device has not solved the problem of inequality of bulk density and weight of mats occurring during the forming process.

BRIEF DESCRIPTION OF THE DRAWINGS

The single drawing FIGURE shows diagrammatically an apparatus for practicing the invention, utilizing two refiners and five formers or felters.

DESCRIPTION OF THE PREFERRED EMBODIMENTS

Referring to the drawing, mixers (A″) and (B″) are linked with the lower ends of cyclones (A′) and (B′), which in turn are linked with two similar refiners (A) and (B) through conduits 1 and 1′, respectively, whereby the fibers from refiners (A) and (B) are conveyed by air to the respective mixers. Formers (a), (b), (c), (d) and (e) are disposed in series over the wire screen belt conveyor 2. Formers (a) and (b) are directly connected with the mixers (A″) and (B″) respectively through conduits 11 and 11′, in which beta ray density measuring counters or devices 4 and 4′ (known per se) are disposed. The lower openings of the formers face their respective associated vacuum boxes (a′)-(e′) through the wire screen conveyor 2.

The formers are provided with shave-off rolls (a″)-(e″), and the openings 3′ of suction pipes 3 face the respective rolls (a″)-(e″), while the other ends of the respective suction pipes 3 are arranged to convey fiber taken from the shave-off roll (a″) to the last-disposed former (e), from the roll (b″) to the former (d), and from the rolls (c″), (d″) and (e″) to the former (c).

Disposed further down the conveyor, after the last former, is a regulating shave-off roll (f) movable up and down within a given range. Movement is effected through an air control valve driven by motor 10, the valve supplying control air to a cylinder to effect vertical motion of the regulating shave-off roll (f). A gamma ray measuring device 5 (known per se) includes a projector 5' emitting radiant rays such as gamma rays onto the mat, and a detector 5'' set up below the mat opposite the projector 5', the projector and detector being disposed between former (e) and regulating shave-off roll (f), so as to send to the control circuit electric signals corresponding to the measured value. The control circuit receives the electrical signal from detector 5'', and processes it through an indicate controller 6, converter 7, ratio setter 8, and isolator 9, passing control current signals to the driving motor 10 of the air control valve of the cylinder to regulate and effect vertical motion of the regulating shave-off roll (f).

When forming the fiber sent in from refiners (A) and (B) into a mat, the fiber from refiner (A) is formed by former (a), tne majority of which is shaved off by the shave-off roll (a'') and then formed again by the former (e), situated downstream. In the case of fiber from refiner (B), the majority is shaved off by the shave-off roll (b'') and then formed again by the former (d).

The weight of the fiber conveyed by air to formers (a) and (b) from refiners (A) and (B) is measured by the beta ray measuring counters or devices 4 and 4', and its detected value acts, through a conventional control circuit 12, 13, 14, upon the motor M of the wire screen conveyor 2 to automatically regulate the running speed of the conveyor in accordance with the total weight of fiber sent to formers (a) and (b) and accumulated on the same spot of the wire-netting conveyor as a mat. The details of the control arrangement form no part of the instant invention.

However, uniformity of the bulk density or weight of the mat accumulating at formers (a) and (b), then shaved off by rolls (a'') and (b''), and further accumulated as a mat at formers (c), (d), and (e), cannot be achieved sufficiently by a mere adjustment of the speed of the conveyor. As a supplemental means, the weight of the mat formed at the last-disposed former (e) is measured continuously by the gamma ray density measuring device 5, and then the mat is shaved by regulating shave-off roll (f) to a height corresponding to a predetermined standard weight, the regulating shave-off roll moving up and down in accordance with changes in the measured weight, such that the height of the mat is varied to keep its weight uniform.

It goes without saying that the weight of the mat accumulated during the forming process is regulated during forming so as not to produce a portion weighing less than the predetermined standard.

As a practical matter, the detected values from the beta ray density measuring device and the gamma ray density measuring devide are preferably integrated in integrator circuits incorporated in their respective control circuits, such that the variation of each detected value is integrated, and the conveyor speed and vertical motion of the regulating shave-off roll are adjusted in keeping with the respective integrated values.

The mat thus produced is then subjected to compression by a pre-pressor and hot-pressing by a hot press in order to procure a composition board in accordance with the invention. There follows a comparison as to the bulk density distribution and the variation of specific gravity of the mat, and bending strength of the board formed by the use of the mat, against those produced by conventional methods:

| | Variation of | Conventional method | Method by this invention |
|---|---|---|---|
| Mats | Bulk density | 0.11±0.01 | 0.11±0.003 |
| Boards | Specific Gravity | 0.63±0.06 | 0.64±0.02 |
| Boards | Bending Strength | 310±35 Kg/cms | 305±10 Kg/cm2 |

Notes:
The size of the test piece is 5cm × 5cm with 12 measuring spots.

The invention enables successive formation of the mat free from unevenness, and decreases as much as possible the amount of fiber shaved from the mat by the regulating shave-off roll (f). Therefore, when the mat is formed into a board by hot pressing, the distribution of mechanical strength is uniform, and there is provided a composition board with a smooth surface, having no color blurs.

We claim:

1. In a method of manufacturing mats to be formed into composition boards of particulate material and binder by hot-pressing, wherein the particulate material with binder is air-conveyed through a conduit to at least one forming apparatus and deposited in mat form onto a moving conveyor, the improvement comprising (a) continuously measuring the weight of material passing through said conduit with a beta ray density measuring device disposed in a section of said conduit, said device producing a signal indicative of the weight of material passing through the conduit at any given time, (b) varying the speed of said conveyor in accordance with said signal, (c) continuously measuring the weight of successive portions of the mat formed by the forming apparatus with a gamma ray density measuring device disposed in the conveyor path downstream of the forming apparatus, said gamma ray device producing a signal continuously indicative of the weight of the mat moving along with the conveyor, and (d) varying the vertical position of a shave-off roll disposed above the mat downstream of the gamma ray device in accordance with the signals from the gamma ray device such that said shave-off roll controls the thickness of the mat by removing material from the surface of said mat in variable amounts so as to maintain substantially uniform weight of the material along the length of the mat to be pressed into composition boards of corresponding uniformity.

* * * * *